United States Patent
John et al.

(10) Patent No.: US 10,205,709 B2
(45) Date of Patent: Feb. 12, 2019

(54) KEY PAIR INFRASTRUCTURE FOR SECURE MESSAGING

(71) Applicant: Visa International Service Association, San Francisco, CA (US)

(72) Inventors: Rhidian John, Helen's Bay (GB); Bartlomiej Piotr Prokop, Belfast (GB); Thomas Looney, Belfast (GB)

(73) Assignee: Visa International Service Association, San Francisco, CA (US)

( * ) Notice: Subject to any disclaimer, the term of this patent is extended or adjusted under 35 U.S.C. 154(b) by 197 days.

(21) Appl. No.: 15/379,227

(22) Filed: Dec. 14, 2016

(65) Prior Publication Data

US 2018/0167367 A1    Jun. 14, 2018

(51) Int. Cl.
*H04L 29/06*  (2006.01)
*H04L 9/08*   (2006.01)
*H04L 9/32*   (2006.01)
*H04L 9/14*   (2006.01)

(52) U.S. Cl.
CPC .......... *H04L 63/0428* (2013.01); *H04L 9/085* (2013.01); *H04L 9/0827* (2013.01); *H04L 9/0891* (2013.01); *H04L 9/14* (2013.01); *H04L 9/3247* (2013.01); *H04L 63/10* (2013.01)

(58) Field of Classification Search
CPC .... H04L 63/0428; H04L 9/085; H04L 9/3247
USPC ....................................................... 713/176
See application file for complete search history.

(56) References Cited

U.S. PATENT DOCUMENTS

| | | | |
|---|---|---|---|
| 6,694,025 B1 | 2/2004 | Epstein et al. | |
| 7,711,122 B2 | 5/2010 | Allen et al. | |
| 8,086,842 B2 * | 12/2011 | Sidhu | H04L 63/0823 |
| | | | 713/150 |
| 8,631,230 B2 | 1/2014 | Manges | |
| 8,775,810 B1 | 7/2014 | Snodgrass et al. | |
| 8,954,740 B1 * | 2/2015 | Moscaritolo | H04L 63/065 |
| | | | 380/277 |
| 9,258,117 B1 | 2/2016 | Roth et al. | |
| 2002/0026575 A1 | 2/2002 | Wheeler et al. | |
| 2004/0179684 A1 * | 9/2004 | Appenzeller | H04L 9/0825 |
| | | | 380/44 |
| 2006/0212706 A1 * | 9/2006 | Jiang | H04L 9/0825 |
| | | | 713/176 |
| 2010/0250949 A1 * | 9/2010 | Torino | H04L 63/0823 |
| | | | 713/176 |
| 2011/0072274 A1 * | 3/2011 | Leoutsarakos | H04L 63/0823 |
| | | | 713/182 |
| 2011/0138179 A1 * | 6/2011 | Jiang | H04L 9/0825 |
| | | | 713/168 |
| 2011/0271099 A1 | 11/2011 | Preiss et al. | |

(Continued)

OTHER PUBLICATIONS

International Search Report and Written Opinion, dated Mar. 20, 2018, In PCT Application No. PCT/US17/065437, 15 pages.

*Primary Examiner* — Teshome Hailu
(74) *Attorney, Agent, or Firm* — Kilpatrick Townsend and Stockton LLP

(57) ABSTRACT

Embodiments of the present invention use a limited-use public/private key pair to encrypt and decrypt messages sent through an intermediary. The messages may contain sensitive information and may be transmitted between entities over one or more networks. In some embodiments, the entities and/or the networks may be untrusted. Nevertheless, the content of the messages may remain protected by virtue of the limited-use key pair infrastructure.

22 Claims, 10 Drawing Sheets

(56) References Cited

U.S. PATENT DOCUMENTS

2015/0381370 A1  12/2015 Lam
2016/0065370 A1   3/2016 Le Saint et al.
2016/0248745 A1   8/2016 Tsirkin
2016/0277339 A1   9/2016 Shi

* cited by examiner

KEY PAIR INFRASTRUCTURE FOR SECURE MESSAGING

BACKGROUND

Conventionally, messages sent from untrusted clients over untrusted networks can be easily eavesdropped by middlemen. These messages may contain sensitive information that can be compromised through their interception by malicious parties. The sensitive information may be used by a malicious party to gain unauthorized access to a resource. For example, a password may be intercepted by a malicious party and used to gain access to personal information.

Oftentimes, messages are sent over untrusted networks because they are well-established and easy to use. For example, a user may send personal information through e-mail, social networking, or other popular channels. Such a user may not realize that many network-based communications offer little protection against eavesdropping and interception. Some users that do realize the risks associated with network-based communications choose nevertheless to use such insecure communications due to the difficulties of using secure methods. In other words, some users believe that the cost, effort and/or technological expertise required to use more secure methods outweigh the benefits of being certain that the message is not compromised.

Thus, unauthorized access to messages during transmission across a network presents significant concerns. These concerns have been attempted to be addressed by various secure transmission techniques. For example, Secure Sockets Layer (SSL) is a security technology that establishes an encrypted link between a web server and a browser, ensuring that data passed between the web server are browser remain private. As another example, Hypertext Transfer Protocol Secure (HTTPS) is a protocol for secure communication over a network within a connection encrypted by SSL. HTTPS provides authentication of a website and its associated web server, as well as bidirectional encryption of communications between the web server and a browser, using SSL.

However, neither of these techniques provide sufficient protection against malicious middlemen. Conventional browser systems may explicitly trust multiple Certificate Authorities, which can be leveraged by both legitimate middlemen (e.g., content delivery networks, data less prevention systems, accelerators, etc.) and malicious middlemen (e.g., fake WiFi hotspots, DNS poisoning systems, etc.). These middlemen can conventionally access the payloads within SSL connections without detection. Thus, malicious middlemen may gain access to apparently secured messages. In addition, legitimate middlemen may themselves become the targets of malicious attacks, again compromising the apparently secure original messages.

SUMMARY

Thus, there is a need for new and enhanced systems and methods of encrypting messages that reduces the possibility of compromise of the underlying, potentially sensitive data. Systems and methods of encryption are needed that are easy to use and deploy by all parties, and that are relatively transparent to the end user without injecting significant delays. Embodiments of the invention can address these and other problems, individually and collectively.

Embodiments of the invention are directed to a key pair infrastructure for secure encryption of messages on an untrusted device. Only the recipient of the message has the ability to decrypt the message, as the secret key is not shared with other parties.

One embodiment of the invention is directed to a method comprising receiving, over a first network, a request for a public key from an access device. The access device sends the request in response to an interaction with a client device. The method further comprises generating the public key, a private key that corresponds to the public key, and a key identifier associated with the private key. The public key and the private key are limited-use keys. The method further comprises transmitting the public key and the key identifier to the access device. The access device transmits the public key and the key identifier to the client device. The method further comprises receiving, over a second network, a message and the key identifier from the client device. The message is encrypted using the public key. The method further comprises retrieving the private key associated with the key identifier, and decrypting the message using the private key.

Another embodiment of the invention is directed to a verification server comprising a processor and memory coupled to the processor. The memory stores instructions, which when executed by the processor, cause the verification server to perform operations including the steps of the above method.

One embodiment of the invention is directed to a method comprising receiving a request to send a message from a client device. The method further comprises requesting a public key from a verification server in response to the interaction. The verification server generates the public key, a private key that corresponds to the public key, and a key identifier associated with the private key. The public key and the private key are limited-use keys. The method further comprises receiving the public key and a key identifier from the verification server. The method further comprises transmitting the public key and the key identifier to the client device. The client device encrypts a message using the public key and transmits the message and the key identifier to the verification server. The verification server retrieves the private key using the key identifier and decrypts the message using the private key.

Another embodiment of the invention is directed to an access device comprising a processor and memory coupled to the processor. The memory stores instructions, which when executed by the processor, cause the access device to perform operations including the steps of the above method.

These and other embodiments of the invention are described in further detail below.

TERMS

Figure 1:
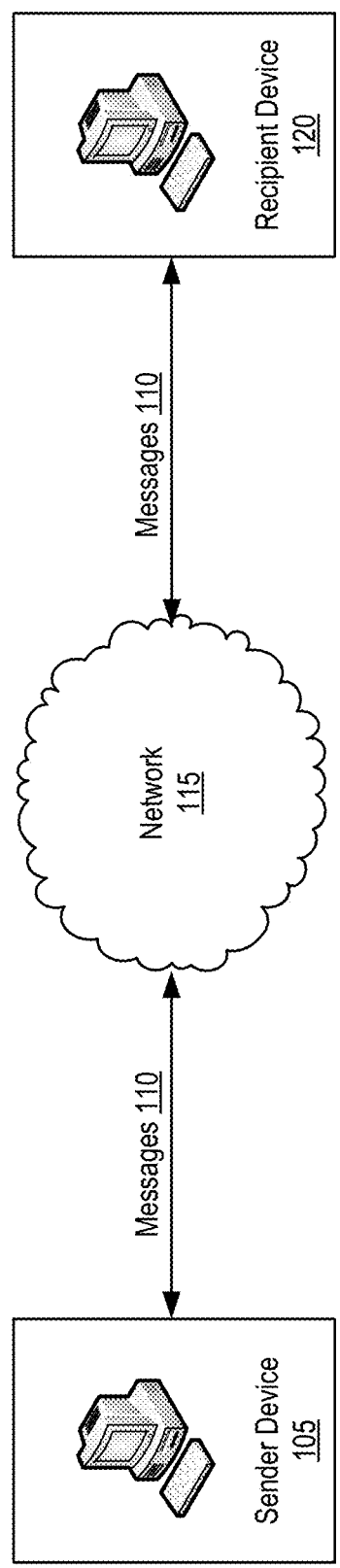
FIG. 1 shows a block diagram depicting a system for sending and receiving messages over a network according to an embodiment of the present invention.

Prior to discussing specific embodiments of the invention, some terms may be described in detail.

An "access device" may be any suitable device for communicating with a server computer, and for interacting with a client device. An access device may generally be located in any suitable location, such as at the location of a resource provider, and may provide access to a resource. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems (e.g., a keypad, a terminal, etc.), websites, and the like. An access device may use any suitable contact or contactless mode of operation to send or receive data from, or associated with, a client device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a client device.

A "client device" may be any device that includes one or more electronic components (e.g., an integrated chip) that can communicate via messaging with another device. For example, a client device can be a computing device that includes at least one processor coupled to a memory that stores instructions or code for execution by the processor. A client device may provide remote communication capabilities to a network. A client device can be configured to transmit and receive data or communications to and from other devices. A client device may be in the form of a computer, a mobile device such as a mobile phone (e.g., smart phone, cellular phone, etc.), tablets, portable media player, personal digital assistant devices (PDAs), wearable computing device (e.g., watch), health monitoring device, electronic reader device (e.g., a card reader device), an Internet-of-Things (IoT) device, etc., or in the form of a card (e.g., smart card) or a fob, etc. Examples of client devices may also include portable computing devices (e.g., laptops, netbooks, ultrabooks, etc.). A client device may also be in the form of a vehicle (e.g., an automobile), or be integrated as part of a vehicle (e.g., an infosystem of a vehicle).

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "key identifier" may refer to any combination of letters, numbers, and/or symbols used to uniquely identify at least one key. A key identifier may be assigned randomly, consecutively, or according to any pattern or algorithm. In some embodiments, a key identifier is derived from a key.

A "limited-use key" may refer to a key that is limited in usage. A limited-use key may be exceeded or exhausted when the underlying condition is met. For example, a limited-use key may include a time-to-live that indicates an amount of time for which a key is valid, and once that amount of time has elapsed, the limited-use key is exceeded or exhausted, and the key may become invalid and may no longer be used. As another example, a limited-use key may include a number of times that a key can be used, and once the key has been used for that number of times, the limited-use key is exceeded or exhausted, and the key may become invalid and may no longer be used.

A "message" may include any communication from one party or entity to another party or entity. The communication may include, for example, information or data in any suitable form. Further, the message may be transmitted by any suitable method such as, for example, over a network.

A "network" may be any type of network, including a private or public network. A private network may be found at a large site, such as a corporate office, a university campus, a hospital, a government office, or a similar entity. A network may also be found at a small site, such as in a private home. A public network may include the Internet. A network may include third-party telecommunication lines, such as phone lines, broadcast coaxial cables, fiber optic cables, satellite communications, cellular communications, and the like.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. In some embodiments, the public key may be generated by another entity. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

A "resource" may refer to an asset that may be used or consumed. For example, a resource may be an electronic resource (e.g., stored data, received data, a computer account, a network-based account, an e-mail inbox, etc.), a physical resource (e.g., a tangible object, a building, a safe, a physical location, etc.), electronic communications between computers (e.g., a communication signal corresponding to an account for performing a transaction), and the like. Access to a resource may be controlled by a resource security system, including a resource computer. The resource computer may control access to a physical resource, such as a building or a lockbox, or an electronic resource, such as a local computer account, digital files or documents, a network database, an e-mail inbox, a payment account, or a website login. In some embodiments, the resource computer may be a webserver, an e-mail server, or a server of an account issuer. The resource computer may receive an access request from a user via a user device. The resource computer may also receive the access request from the user via a request computer coupled with an access device. In some embodiments, the request computer may be a service provider than is different from a resource provider. To gain access to a resource, a user may enter one or more of an account number, a personal identification number, and a password into an access device, and the request computer may generated and send an access request to the resource computer to request access to the resource. In another example, the user may operate a user device to request that the resource computer provide access to an electronic resource that is hosted by the resource computer. In another example, the user device may send an access request (e.g., an e-mail) to the resource computer (e.g., an e-mail server) in order to provide data to the electronic resource (e.g., deliver the e-mail to an inbox). In another example, the user may provide an account number and/or a personal identification number to an access device in order to request access to a resource (e.g., a payment account) for conducting a transaction.

"Sensitive information" may refer to information for which protection from unauthorized usage is desired, or information for which privacy protection is desired. For example, sensitive information may refer to confidential information, or may refer to information that can be used by an unauthorized entity to commit fraud such as fraudulent transactions or identity theft. Examples of sensitive information may include trade secret, corporate confidential information, confidential legal documents, government protected data, etc. Examples of sensitive information may also include personal information such as health data, social security number, contact information, location information, and/or financial information such as account identifiers, rewards information, loyalty program information, etc. Sensitive information may also include cryptographic keys that can be used to encrypt or decrypt information.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A message that includes a digital signature by a signing party is said to be "signed" by the signing party.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "verification server" may be a server computer that performs verification services. The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

DETAILED DESCRIPTION

Embodiments of the present invention use a limited-use public/private key pair to encrypt and decrypt messages sent through an intermediary. The messages may contain sensitive information and may be transmitted between entities over one or more networks. In some embodiments, the entities and/or the networks may be untrusted. Nevertheless, the content of the messages may remain protected by virtue of the limited-use key pair infrastructure.

Embodiments of the present invention provide for a number of advantages. An entity requesting the message may be protected from exposure to (and responsibility for) any sensitive information, as the message is sent through an intermediary. The intermediary may take action on the message on behalf of the requesting entity, or may provide the requesting entity with a token representing the sensitive information to be used in transactions with the sending entity. Because the intermediary receives and stores the message from the sending entity in an encrypted form that is not interpretable, the information remains secure over the network and at the intermediary. Thus, security of the entities and network is improved.

The use of limited-use public/private key pair also provides advantages. Because the public/private key pair is asymmetric, interception of the public key by a malicious party would not compromise the message. For example, if a malicious party were to intercept the public key being sent from the intermediary to the sending entity, and again intercept the message being sent from the sending entity to the intermediary, the public key could not be used to decrypt the message. The message could only be decrypted using the private key, which is securely stored only at the intermediary and is not transmitted over a network to any other entities. Further, because the public/private key pair is limited-use (i.e., has a short valid lifetime or is limited to a particular number of uses), any cracking attempts would be unfeasible in the short amount of time that the key pair is valid. Even if the private key could be discovered, the malicious party would only gain access to a single or limited number of messages.

I. MESSAGING

Messaging is the process of delivering any type of data from a sender to a recipient. The data may contain any information that needs to be communicated to the recipient. Messaging may occur over a network, for example, to transmit data to a remote party.

FIG. 1 illustrates a block diagram of a system for sending and receiving messages according to an embodiment of the present invention. FIG. 1 illustrates a sender device 105 communicating with a recipient device 120 over a network 115. Sender device 105 may send and receive messages 110 from recipient device 120 over the network 115.

The messages 110 may be any type of messages sent over a network 115. For example, messages 110 may use plain text, Hypertext Transfer Protocol (HTTP), Transmission Control Protocol (TCP), and the like. In some systems, the sender device 105 and/or the network 115 may be untrusted. For example, sender device 105 may be a browser, a card reader, an Internet-of-Things (IoT) device, or the like. Network 115 may be a Transport Layer Security (TLS) connection, but the connection may pass through middlemen that break the true end-to-end connection, such as network accelerators, Data Loss Prevention systems, Content Delivery Networks, proxy servers, load balancers, and the like. In other words, the connection between the sender device 105 and the recipient device 120 may not be secure. Thus, it is difficult to securely send and receive messages 110 that contain sensitive information.

In addition, in some situations, sender device 105 may not want recipient device 120 to have access to its sensitive information, and/or recipient device 120 may not want access to sensitive information from sender device 105 if it can be avoided. Such situations arise, for example, when recipient device 120 is untrusted or easily compromised, when recipient device 120 is not certified to handle sensitive information, or when recipient device 120 does not want to assume responsibility for the sensitive information. In these situations, third party messaging systems may be used to protect recipient device 120 from the sensitive information.

Figure 2:
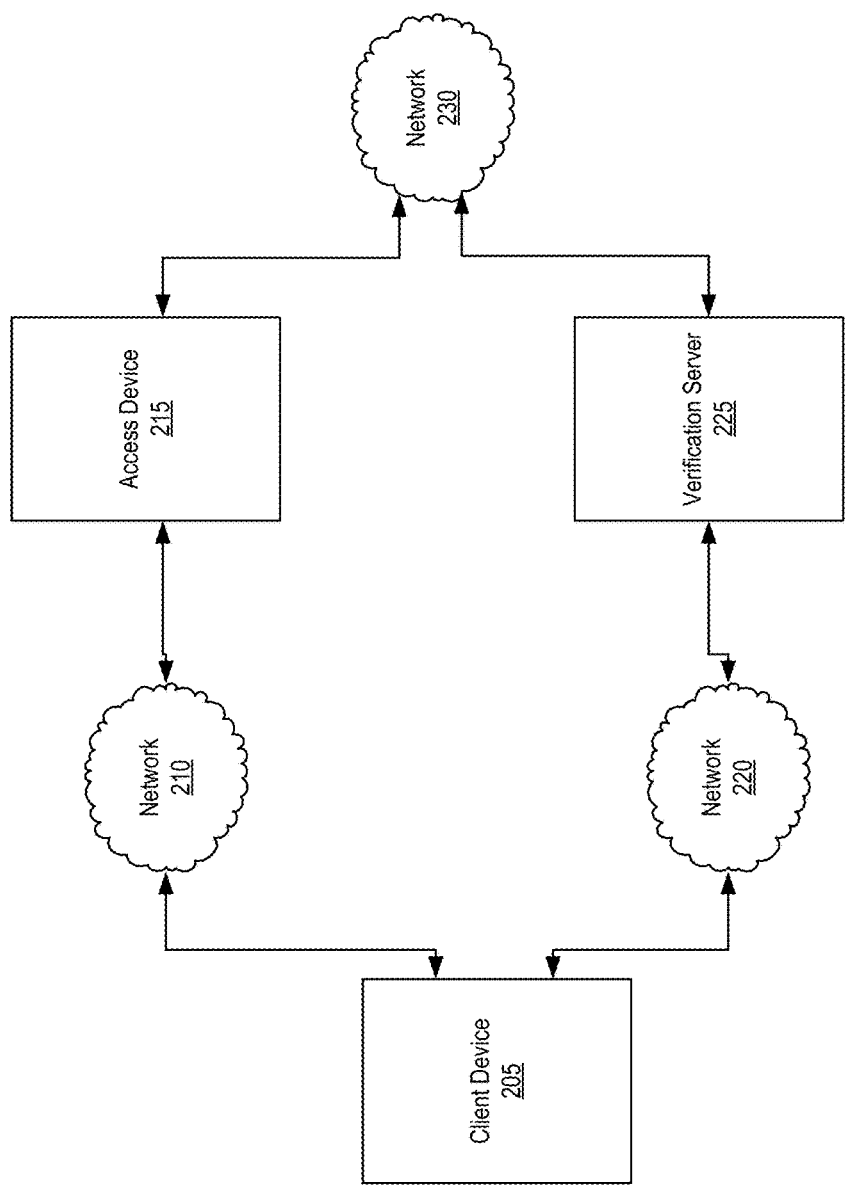
FIG. 2 shows a block diagram depicting a system for third party messaging according to an embodiment of the present invention.

FIG. 2 is a block diagram depicting a system for third party messaging according to an embodiment of the present invention. In FIG. 2, client device 205 (e.g., sender device 105 of FIG. 1) wishes to share sensitive information with access device 215 (e.g., recipient device 120 of FIG. 1), such as to gain access to a resource. However, access device 215 may not want to assume responsibility for the sensitive information, for example. In another example, client device 205 may not trust the connection between client device 205 and access device 215 (i.e., over network 210).

According to a third party messaging system, client device 205 sends the sensitive information over network 220 to verification server 225. This may be advantageous, for example, because network 220 may be more secure than network 210, and/or because verification server 225 may be more secure than access device 215. Verification server 225 may then take any actions using the sensitive information that are specified by access device 215. For example, in the case that the sensitive information contains a password, verification server 225 may validate the password and communicate to access device 215 that the password was validated over network 230. Access device 215 may then provide client device 205 with access to the resource based on the validation results, without knowing the sensitive information.

Thus, third party messaging systems may protect sensitive information from disclosure to access device 215. However, further techniques are desirable to protect the sensitive information over network 220, such as by using encryption techniques.

II. KEY PAIR INFRASTRUCTURE FOR ENCRYPTION

Embodiments of the present invention use a public/private key pair to encrypt and decrypt messages that may contain sensitive information. Thus, messages may be securely sent from untrusted client devices over an untrusted network with a reduced possibility of compromise.

A. Messaging Using Third Parties

Turning back to FIG. 2, a key pair infrastructure may be used to encrypt messages being sent between client device 205, access device 215, and/or verification server 225. For example, access device 215 may need client device 205 to send a message to verification server 225. The message may be a short message (e.g., a PAN, a password, a PIN, a code, payment details, etc.) with sensitive data that should be protected from access device 215. Thus, access device 215 may request a public key from verification server 225.

In some embodiments, upon receipt of the request from access device 215, verification server 225 may generate a public/private key pair and key identifier. In other embodiments, upon receipt of the request from access device 215, verification server 225 retrieves a pre-generated public/private key pair stored and queued for fast assignment to minimize latency. The public/private key pair may be limited-use keys that are only valid for a short time period, such as for a short duration of time, or for a limited number of uses.

Verification server 225 sends the public key and the key identifier to access device 215. Access device 215 receives the public key and key identifier, and forwards them to client device 205. It is contemplated, however, that in some embodiments, verification server 225 may directly send the public key and the key identifier to client device 205.

Client device 205 generates a message and encrypts the message using the public key. Client device 205 then sends the encrypted message and the key identifier to verification server 225. Verification server 225 uses the key identifier to retrieve the private key from the public/private key pair and attempts to decrypt the encrypted message using the private key. If the message is unsuccessfully decrypted, the message may be dropped as the public key, the private key, and/or the message may have been tampered with. If the message is successfully decrypted, the message may be accepted, and a receipt acknowledgment may be generated and sent to access device 215. Verification server 225 may then use the decrypted message to perform any functions required by access device 215.

B. Use of Shared Secrets

Figure 3:
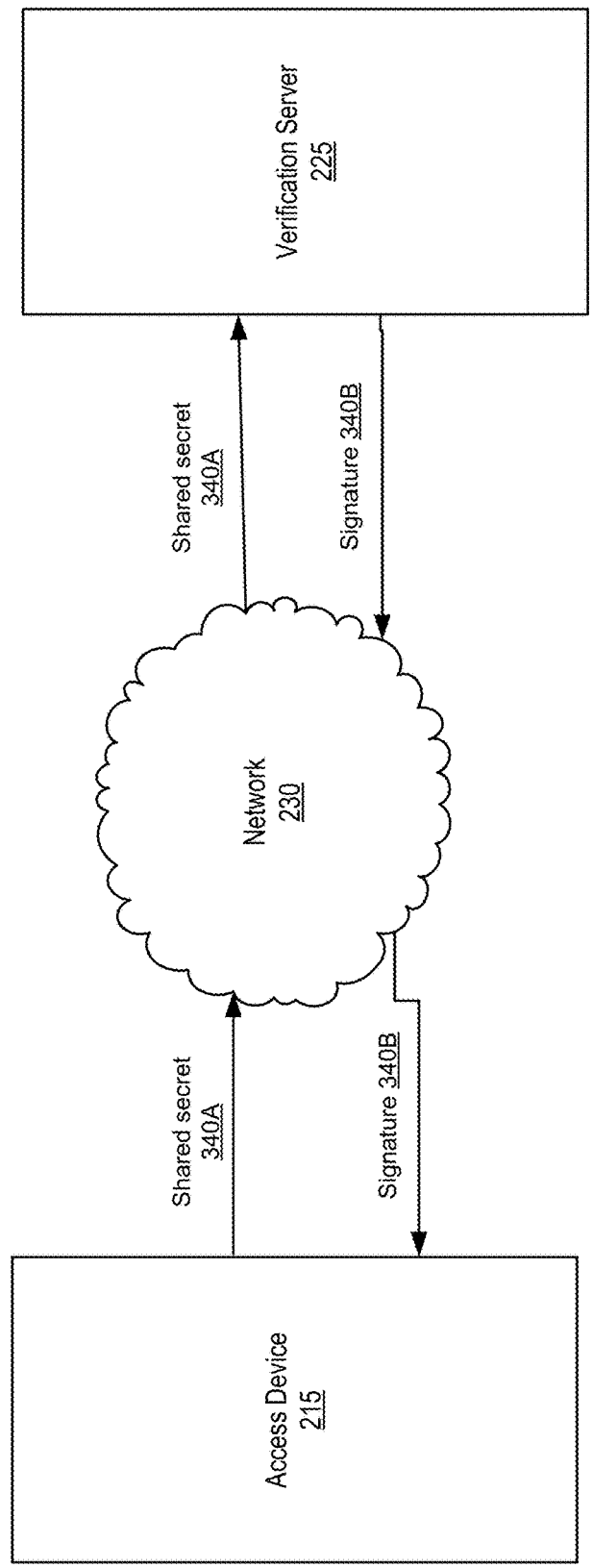
FIG. 3 shows a block diagram depicting a system for secure messaging using a shared secret according to an embodiment of the present invention.

Shared secrets may be used in some embodiments to further validate the authenticity of the data exchanged. For example, FIG. 3 shows a block diagram depicting a system for secure messaging using a shared secret according to an embodiment of the present invention. According to FIG. 3, access device 215 may share a shared secret 340A with verification server 225 over network 230. The shared secret may be any piece of data known only to access device 215 and verification server 225. For example, shared secret 340A may be any random or intentional combination of letters, numbers and/or symbols constituting, for example, a password or passphrase. In some embodiments, shared secret 340A is shared between access device 215 and verification server 225 prior to initiating a communication exchange (e.g., when first establishing a relationship between access device 215 and verification server 225). In some embodiments, shared secret 340A is shared between access device 215 and verification server 225 at the start of a communication exchange. Although shown and described as being sent from access device 215 to verification server 225, it is contemplated that shared secret 340A may instead be established by verification server 225 and sent to access device 215.

After sharing the shared secret 340A, verification server 225 may generate a signature 340B using the shared secret 340A and some accompanying data (e.g., a public key) to mark the authenticity of the accompanying data. For example, verification server 225 may send signature 340B to access device 215. Upon receipt of the signature 340B, access device 215 may verify that the public key has not been tampered with by validating the signature 340B with the shared secret 340A.

C. Re-Use of Key Pair

Figure 4:
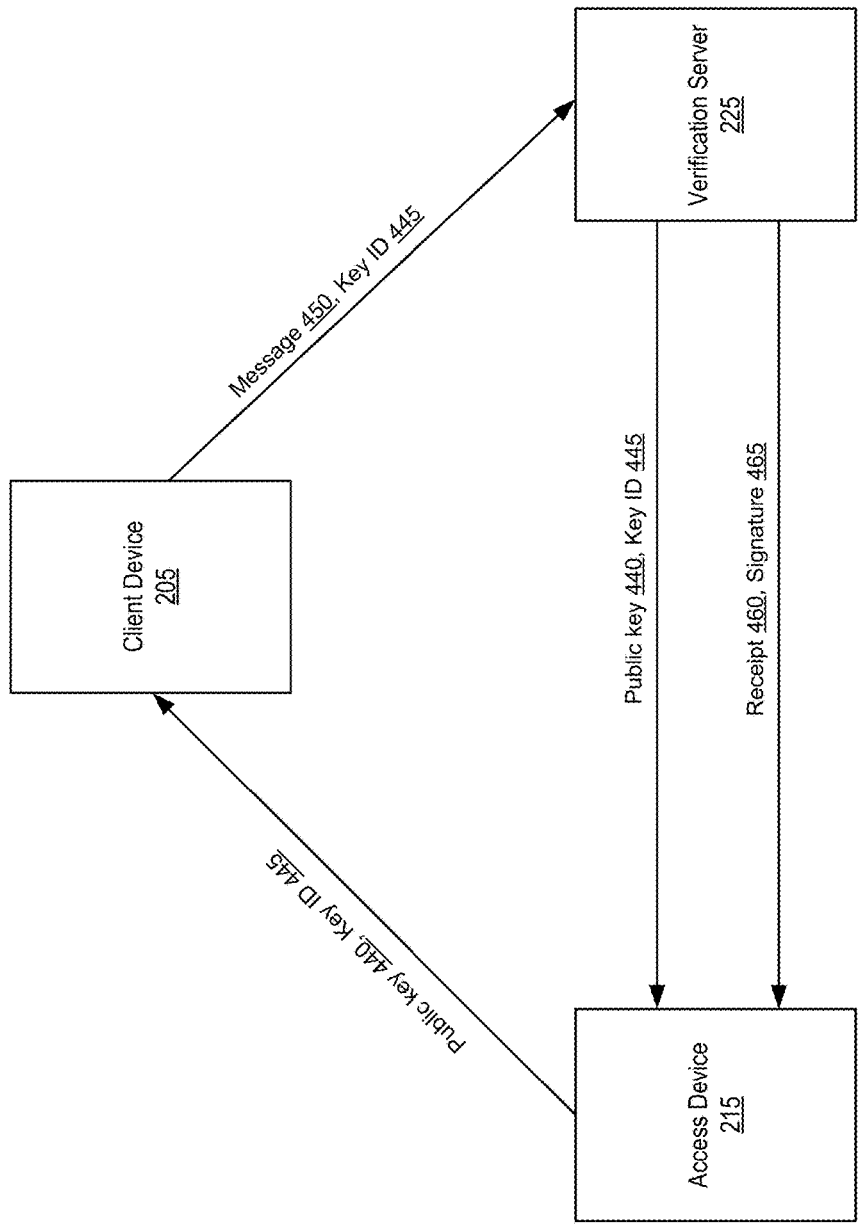
FIG. 4 shows a block diagram depicting a system for secure messaging using and reusing a key pair infrastructure according to an embodiment of the present invention.

Some embodiments of the invention can re-use the same key pair more than once for a given verification process. For example, FIG. 4 shows a block diagram depicting a system for secure messaging using and reusing a key pair infrastructure according to an embodiment of the present invention. According to FIG. 4, verification server 225 may send a public key 440 and a key identifier 445 to access device 215. Access device 215 may then forward the public key 440 and the key identifier to client device 205. Client device 205 may generate a message 450, encrypt the message with the public key 440, then send the message 450 and the key identifier 445 to the verification server 225. Verification server 225 may then decrypt message 450 using a private key corresponding to the public key 440. This process represents the first usage of the public/private key pair.

Once message 450 is decrypted, verification server 225 may need to take some action with respect to access device 215 based on the content of message 450. Verification server 225 may encrypt or sign such actions again using the private key corresponding to public key 440. For example, verification server may need to notify access device 215 that message 450 was safely received and properly decrypted, and/or that message 450 was not properly decrypted. In that example, verification server 225 may generate a receipt 460 and send it to access device 215 along with a signature 465 of the receipt 460 generated using the private key. Access device 215 may use the public key 440 to verify the signature 465 to ensure that the receipt 460 has not been tampered with. In this example, this process represents the second usage of the public/private key pair.

In another example, verification server may need to provide access device 215 with a representation of the content of message 450 for recording purposes. In that example, verification server 225 may generate a token (not shown) and send it to access device 215 along with a signature 465 of the token generated using the private key.

Upon receipt, access device 215 may use the public key 440 to verify signature 465 to ensure that the token has not been tampered with. In this example, this process represents the second usage of the public/private key pair.

It is contemplated, however, that multiple examples may be combined, such that a receipt, a token, and/or any other data is provided back to access device 215 in a single message or multiple messages that may each or collectively include a signature. Access device 215 may use the public key 440 separately or collectively to verify the signature. Thus, the public/private key pair may be used more than two times in a given verification process in some embodiments. In these embodiments, the public/private key pair may be limited use in the sense that they are designated for only a certain number of anticipated uses (e.g., three uses: once to encrypt/decrypt a message 450, once to verify the signature accompanying a receipt 460, and once to verify the signature accompanying a token). Although described in this example with respect to three uses, it is contemplated that a public/private key pair may be limited to any number of uses.

III. METHODS

Various methods may be used by client device 205, access device 215, and verification server 225 to implement the embodiments of the invention described above.

A. Sequence Diagram

Figure 5:
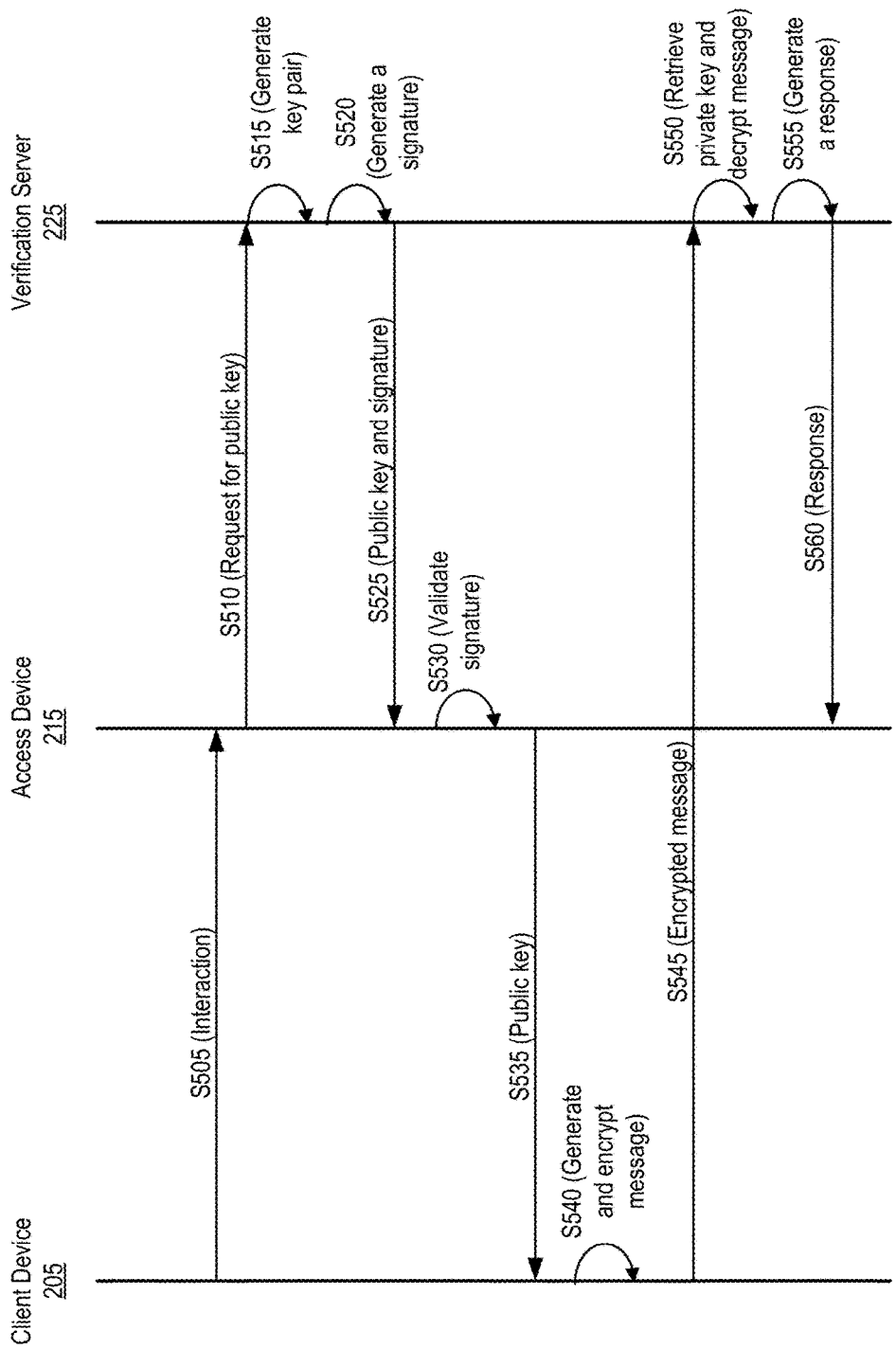
FIG. 5 shows a flow diagram depicting a method for secure messaging using a key pair infrastructure according to an embodiment of the present invention.

For example, FIG. 5 shows a flow diagram depicting a method for secure messaging using a key pair infrastructure according to an embodiment of the present invention. At step S505, client device 205 initiates an interaction with access device 215. For example, client device 205 may interact with access device 215 because it wishes to share information with access device 215. However, access device 215 may prefer or require that client device 205 provide the information to a third party in a message, instead of providing the information directly to access device 215 (e.g., if the information is too sensitive for access device 215 to handle). Thus, at step S510, access device 215 sends a request for a public key to encrypt the message to verification server 225.

In some embodiments, at step S515, verification server 225 generates a public/private key pair and a key identifier. In other embodiments, at step S515, verification server 225 retrieves a pre-generated public/private key pair and a key identifier. The public/private key pair may include limited-use keys. At step S520, verification server 225 generates a signature for the public key using a shared secret that was previously established between verification server 225 and access device 215. At step S525, verification server 225 sends the public key from the public/private key pair, the key identifier, and the signature to access device 215.

At step S530, access device 215 validates the signature using the shared secret, verifying that the public key has not been tampered with. At step S535, access device 215 pushes the public key and the key identifier to client device 205.

At step S540, client device 205 generates a message and encrypts the message using the public key. At step S545, client device 205 sends the encrypted message and the key identifier to verification server 225.

At step S550, verification server 225 retrieves the private key from the public/private key pair using the key identifier and decrypts the message. At step S555, verification server 225 generates a response to access device 215 (e.g., a receipt, a token, etc.). At step S560, verification server 225 sends the response to access device 215.

B. Verification Server

Figure 6:
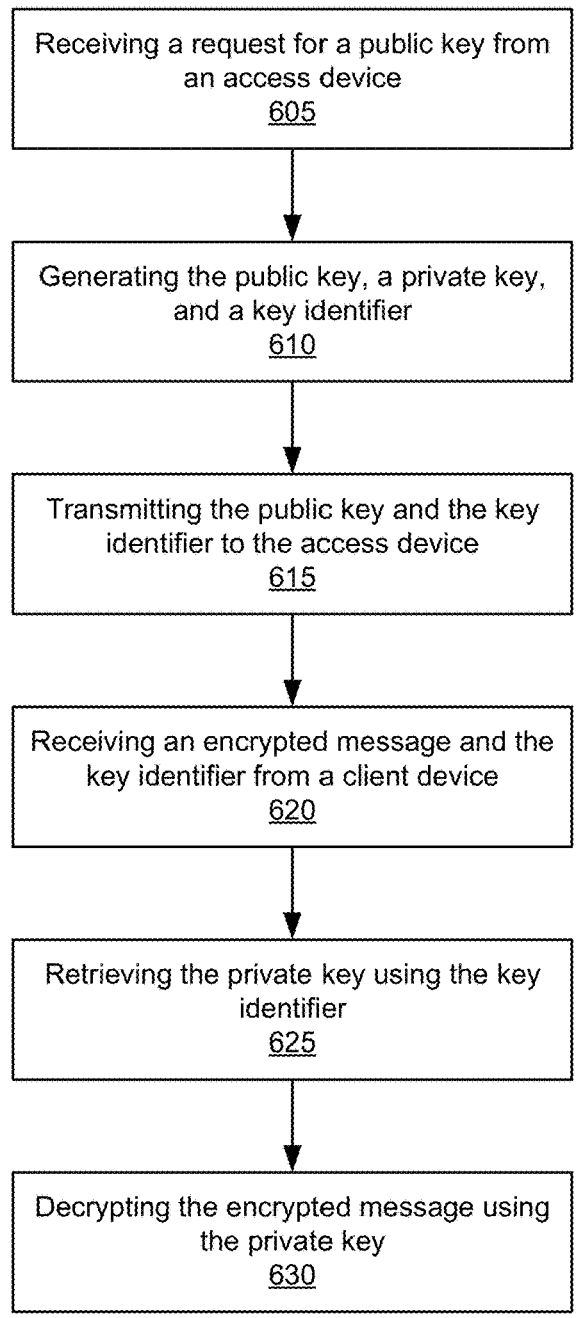
FIG. 6 shows a flow diagram depicting a method for secure messaging using a key pair infrastructure from the viewpoint of a verification server according to an embodiment of the present invention.

FIG. 6 shows a flow diagram depicting a method for secure messaging using a key pair infrastructure from the viewpoint of a verification server according to an embodiment of the present invention. At step 605, a request for a public key is received from an access device. The request may be received over a first network. The access device may send the request in response to an interaction with a client device.

At step 610, the public key, a private key that corresponds to the public key, and a key identifier associated with the private key are generated. The public key and the private key may be limited-use keys. For example, the public key and the private key may be limited to a particular duration of validity (e.g., 15 minutes) or to a particular number of uses (e.g., 2 uses). In some embodiments, the public/private key pair is asymmetric. Once generated, the private key and the key identifier may be stored in a table in a database for later reference, as described herein.

At step 615, the public key and the key identifier are transmitted to the access device. The public key may be transmitted to the access device with a signature generated using a shared secret. The access device then transmits the public key and the key identifier to the client device.

At step 620, a message and the key identifier are received from the client device. The message and the key identifier may be received over a second network that may be the same as or different than the first network. The message may be encrypted by the client device with the public key that it obtained from the access device.

At step 625, the private key is retrieved using the key identifier. For example, the private key may be stored in a table in association with the key identifier as described above with respect to step 610. When the key identifier is received from the client device, the table may be searched for the key identifier, and the associated private key may be extracted. The table may be indexed (e.g., sequentially ordered) by the key identifier in order to expedite searches for key identifiers. In some embodiments, the private key is only retrieved after determining that it has not yet expired. In some embodiments, the private key is retrieved, then a determination is made whether it has expired.

At step 630, the message is decrypted using the private key if it has not yet expired. In some embodiments, after the message is decrypted, a token or receipt corresponding to the message is generated and transmitted to the access device. In some embodiments, a signature of the private key may also be generated and transmitted to the access device. The access device may then validate the signature using the public key.

Once re-used, the public/private key pair may then be invalidated as expired. In some embodiments, the public/private key pair may be invalidated by removing the private key and key identifier from the stored table in the database. Thus, if a message is received that has been encrypted with the public key and that has an accompanying key identifier, the private key and key identifier are no longer stored so the message may not be decrypted. In some embodiments, the public/private key pair may be invalidated by adding a field to the stored table in the database indicating that it is expired. Thus, if a message is received that has been encrypted with the public key and that has an accompanying key identifier, the private key and key identifier may be flagged as invalid and may no longer be used to decrypt the message.

C. Access Device

As described herein, an access device may request that a client device routes information through a verification server, instead of sending it directly to the access device. For example, in the case of sensitive information, a client device may send the sensitive information to a verification server that verifies the sensitive information and provides an indication of the verification back to the access device. Thus, the access device is protected from exposure to the sensitive information.

Figure 7:
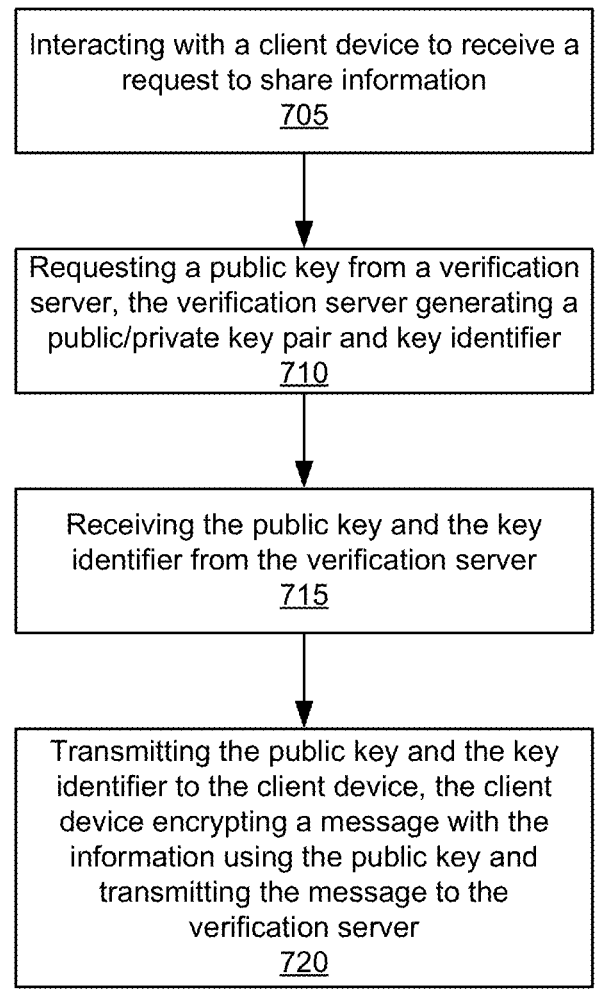
FIG. 7 shows a flow diagram depicting a method for secure messaging using a key pair infrastructure from the viewpoint of an access device according to an embodiment of the present invention.

FIG. 7 shows a flow diagram depicting a method for secure messaging using a key pair infrastructure from the viewpoint of an access device according to an embodiment of the present invention. At step 705, the access device interacts with a client device. The interaction may be, for example, a request to share information with the access device. The client device and/or the access device may want this information to be shared with a third party and secured by the third party in some manner before being shared with the access device, for example.

In response to the interaction, a public key is requested from a verification server at step 710. The verification server either generates or retrieves the public key, a private key corresponding to the public key, and a key identifier associated with the private key. The public key and the private key may be limited-use keys. In some embodiments, the verification server also generates a signature of the public key using a shared secret. The shared secret may have been previously shared between the verification server and the access device.

At step 715, the public key and a key identifier are received from the verification server. In some embodiments in which the verification server also generates a signature, the signature is also received from the verification server. The access device may then validate the signature using the shared secret to ensure that the public key has not been tampered with.

At step 720, the public key and the key identifier are transmitted to the client device. The client device encrypts a message with the information using the public key and transmits the message and the key identifier to the verification server. The verification server retrieves the private key using the key identifier and decrypts the message using the private key.

IV. EXAMPLE SYSTEMS

Various systems may be used to implement the methods described above. An exemplary verification server is now described.

Figure 8:
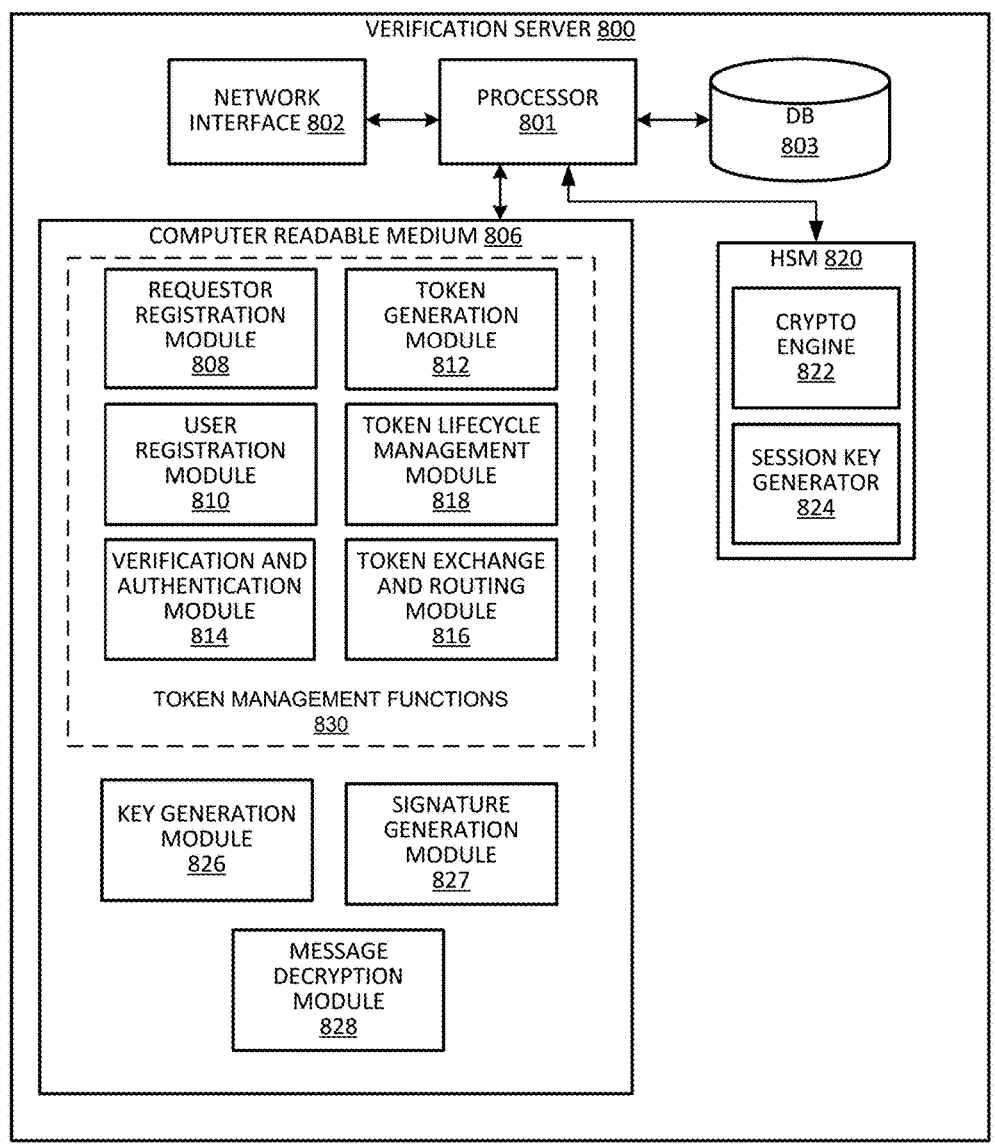
FIG. 8 shows a block diagram depicting a verification server for secure messaging using a key pair infrastructure according to an embodiment of the present invention.

FIG. 8 shows a block diagram of a verification server 800 according to embodiments of the present invention. Verification server 800 may be used to implement verification server 225 of FIG. 2, for example, and may be a token server computer or comprise a token server computer in embodiments in which verification server 800 provides tokens. Verification server 800 may include a processor 801 coupled to a network interface 802 and a computer readable medium 806. In some embodiments, verification server 800 may also include a hardware security module (HSM) 820. Verification server 800 may also include a token registry that may be internal or external to verification server 800.

Processor 801 may include one or more microprocessors to execute program components for performing the functions of computer readable medium 806, such as token management functions 830. Network interface 802 may be configured to connect to one or more communication networks to allow verification server 800 to communicate with other entities such as a client device operated by a user, an access device operated by a resource provider, an application provider computer or a token request computer, resource provider computer (e.g., merchant computer), transport computer (e.g., acquirer computer), authorizing entity computer (e.g., issuer computer), etc. Computer readable medium 806 may store code executable by the processor 801 for implementing some or all of the token management functions 830 of verification server 800 described herein. For example, computer readable medium 806 may include a requestor registration module 808, a user registration module 810, a token generation module 812, a verification and authentication module 814, a token exchange and routing module 816, and a token life-cycle management module 818. In addition to token management functions 830, computer readable medium 806 may include a key generation module 826, a signature generation module 827, and a message decryption module 828.

Requestor registration module 808 may, in conjunction with the processor 801, register a token requestor entity (e.g., access device) with the database 803, and to generate a token requestor identifier (ID) for the registered entity. Each registered entity can use their respective token requestor ID as part of a token service request to facilitate identification and validation of the entity. In some embodiments, a token requestor entity may provide token requestor information to the requestor registration module 808 such as an entity name, contact information, an entity type (e.g., merchant, wallet provider, payment service provider, issuer, payment enabler, acquirer, etc.). In some embodiments in which the token is transaction related, the token requestor information may also include token presentment modes (e.g., scan, contactless, e-commerce, etc.), token type (e.g., primary token, subtoken, payment identifier, static/dynamic, payment/non-payment), integration and connectivity parameters, and services subscribed (e.g., token request, authentication and verification, life-cycle management, etc.) and any other relevant information for the onboarding process.

User registration module 810 may, in conjunction with the processor 801, perform registration of users and accounts of the users. In some embodiments, verification server 800 may allow authorized entities to register consumer accounts (e.g., payment or financial accounts) with the network token system on behalf of the users. For example, a registered token requestor may provide a token requestor ID (e.g., received at the time of registration from the requestor registration module 808), an account identifier or other sensitive information or sensitive information identifier for which a token can substitute, a consumer name and contact information, device identifier of the consumer's communication device, a token type, and any other relevant information for individual account registration or bulk account registration. In some embodiments, user registration module 810 working in conjunction with the processor 801 may store the account details and sensitive information in database 803 for all successful activation and registration requests. In some embodiment, an authorized entity may also unregister users and accounts by providing the necessary information to verification server 800.

Token generation module 812 can be programmed to generate and/or provide a token that is associated with sensitive data (e.g., account information). For example, the token generation module 812 may generate a primary token that can be used as a substitute for a real account identifier (e.g., a Primary Account Number (PAN) of an account), and maintain a stored association (e.g., mapping) between the primary token and the PAN, such that a token exchange and routing module 816 is able to "translate" the primary token back to the original PAN. In some embodiments, the primary token is mathematically derived from the original PAN. In other embodiments, the primary token is randomly generated with respect to the original PAN, and is simply linked to it in a data table. Regardless of how the primary token is generated from the PAN and vice versa, the use of a primary token instead of a real account identifier during a transaction can provide enhanced security. In some embodiments, the primary token and/or information regarding the primary token may be stored in a token vault.

In some embodiments, token generation module 812 may be programmed to receive a token requestor ID and an account identifier or sensitive information identifier. In some embodiments, token generation module 812 may also be programmed to receive optional information such as a user name, a user address and zip code, a requested token or sensitive information type (e.g., primary token, subtoken, static, dynamic, non-payment, etc.), device identifier, and/or suitable information. In some embodiments, token generation module 812 may be programmed to generate a response with the requested token or requested sensitive information, a token expiration date associated with the token, and/or a token assurance level associated with the token. In some embodiments, token generation module 812 may be programmed to validate the token requestor ID and maintain the correlation between the token, the sensitive information, or account identifier being substituted by the token, and the associated token requestor. In some embodiments, token generation module 812 may be programmed to determine if a token already exists in the database 803 for a token request before generating a new token. In some embodiments, if a token cannot be provisioned, the token response may include a corresponding reason code. In some embodiments, token generation module 812 may also be programmed to provide an interface to the token requestors to submit a bulk token request file.

In some embodiments, the token may be generated on the fly using API calls. For example, when a request is received to tokenize an account identifier, token generation module 812 may determine a token range to assign the token. The token range may be assigned based on whether the issuer is provisioning the token (e.g., issuer assigned token range) or the transaction processing network is provisioning the token on behalf of the issuer (e.g., transaction processing network assigned token range). As an example, if the transaction processing network assigned token range includes "442400000-442400250," then "4424000000005382" may be assigned as a token value.

Verification and authentication module 814 may, in conjunction with the processor 801, execute a consumer verification and authentication process, and determine a token assurance level based on the outcome of the verification and authentication process. For example, the verification and authentication module 814, working in conjunction with processor 801, can perform consumer authentication and verification through a configured authentication scheme. In some embodiments, the authentication scheme may include verification of the account identifier, verification values, the expiration date, and/or a delivery channel identifier based on the customer information stored in a database associated with the transaction processing network. In some embodiments, the authentication scheme may include direct verification of the consumer by the issuer using consumer tokens for their online banking system.

In some embodiments, user registration, token generation, and verification and authentication may be performed as part of processing a single token request process. In some embodiments, for bulk requests, user registration and token generation may be performed by processing a bulk file from the token requestor. In such embodiments, consumer verification and authentication may be performed in a separate step. In some embodiments, the token requestor can request that the authentication and verification process be performed multiple times for a particular account to reflect any changes to the levels of assurance for the token over time.

Token exchange and routing module 816 may, in conjunction with the processor 801, process requests for any underlying sensitive information (e.g., an account number) associated with a given token. For example, a transaction processing network, acquirer, issuer, etc. may issue a request for a token exchange during processing of a transaction. Token exchange and routing module 816 may, in conjunction with the processor 801, validate that the requesting entity is entitled to make a request for a token exchange. In some embodiments, token exchange and routing module 816 may, in conjunction with the processor 801, validate the account identifier (or other sensitive information) to token mapping and presentment mode based on the transaction timestamp and the token expiration timestamp. Token exchange and routing module 816 may, in conjunction with the processor 801, retrieve the account identifier (or other sensitive information) from database 803, and provide it along with the assurance level to the requesting entity. In some embodiments, if the account identifier (or other sensitive information) to token mapping is not valid for the transaction timestamp and presentment mode, an error message may be provided.

Token life-cycle management module 818 may, in conjunction with the processor 801, perform life-cycle operations on the tokens managed by verification server 800. Life-cycle operations may include canceling a token, activating or deactivating a token, updating token attributes, renewing a token with a new expiration date, etc. In some embodiments, a token requestor entity may provide a token requestor ID, a token number, a life-cycle operation identifier and one or more token attributes to verification server 800 to perform the requested life-cycle operation on a given token. Token life-cycle management module 818 may verify the token requestor ID and the token association based on information in database 803. Token life-cycle management module 818 may, in conjunction with the processor 801, perform the requested life-cycle operation on a given token, and update the corresponding associations in database 803. Examples of life-cycle operation may include a token activation operation to activate an inactive, suspended, or temporarily locked token and its associations; a token de-activation operation to temporarily lock or suspend a token; a cancel token operation to permanently mark a token and its associations as deleted to prevent any future transactions, etc. In some embodiments, a deleted token may be used during returns/chargebacks if the same token was used to submit the corresponding original transactions.

Key generation module 826 may, in conjunction with processor 801, generate public/private key pairs and key identifiers associated with the private keys. The public/private key pairs may be limited-use keys in some embodiments, and the use and expiration of the public/private key pairs may be tracked by key generation module 826. Once generated, the public/private key pairs may be stored in association with their key identifiers in database 803. In some embodiments, key generation module 826 may, in conjunction with processor 801, generate public/private key pairs "on the fly" after a request for a key is received.

In some embodiments, key generation module 826 may, in conjunction with processor 801, pre-generate public/private key pairs even before a request for a key is received, queuing them for fast assignment to minimize latency. For example, key generation module 826 may pre-generate multiple public/private key pairs and corresponding key identifiers. Key generation module 826 may then store each public/private key pair with its associated key identifier in database 803. When a request for a key is received, key generation module 826 may select a public/private key pair from database 803 according to any criteria. For example, key generation module 826 may sequentially assign public/private key pairs from the list of generated public/private key pairs (i.e., following a first in, first out process). In another example, key generation module 826 may randomly assign public/private key pairs from the list of generated public/private key pairs. In another example, key generation module 826 may designate certain public/private key pairs for certain requestors, and select a public/private key pair from those designated for that requestor when a request is received from the requestor. Once a public/private key pair is selected, it may be retrieved from database 803 by key generation module 826.

Signature generation module 827 may, in conjunction with processor 801, generate signatures for data that can be used to verify the authenticity of the data. For example, signature generation module 827 may, in conjunction with processor 801, generate a signature for a public key using a shared secret between verification server 800 and an access device requesting the public key. When the access device receives the public key, the access device may verify that the public key has not been tampered with by validating the signature with the shared secret. In another example, signature generation module 827 may, in conjunction with processor 801, generate a signature for a token using a private key. When the access device receives the token, the access device may verify that the token has not been tampered with by validating the signature with the public key.

According to some embodiments, verification server 800 may include an HSM 820 to perform secure functions such as encryption and decryption operations, and, in some embodiments, generation of session keys used for some encryption and decryption operations. HSM 820 may include cryptography engine 822 and session key generator 824. For example, for each request that verification server 800 receives and processes, session key generator 824 may generate a session key that can be unique for each request received from the particular token requestor, or unique to each request associated with a particular user or account. In some embodiments, the session key can be the same or different than the encryption key that is used to establish the secure communication channel (e.g., TLS, SSL, etc.) between the token requestor and verification server 800. Token generation module 812 may, in conjunction with the processor 801, generate or otherwise retrieve a token to fulfill the request. The session key can be used by cryptography engine 822 and the processor 801 to encrypt that token using an encryption algorithm, and the encrypted token can be provided to the token requestor. In some embodiments, the generated session key is also provided to the token requestor with the encrypted token.

In some embodiments, cryptography engine 822 may, in conjunction with processor 801, retrieve a stored private key from database 803 based on a received key identifier associated with the private key. Cryptography engine 822 may then, in conjunction with processor 801, decrypt an encrypted message using the private key.

Although verification server 800 has been described with an HSM implementing only some of its functions, it should be understood that other functionalities of the respective computers (e.g., token generation) can be implemented inside an HSM as well. Furthermore, some or all of the respective HSM functionalities can also be implemented outside of a HSM.

V. EXAMPLES

A. Transaction Processing

Embodiments of the present invention may be used in messaging for transaction processing. Exemplary transactions that may implement messaging according to some embodiments of the present invention include payment transactions, access transactions (e.g., physical access, data access, resource access, etc.), and the like.

Figure 9:
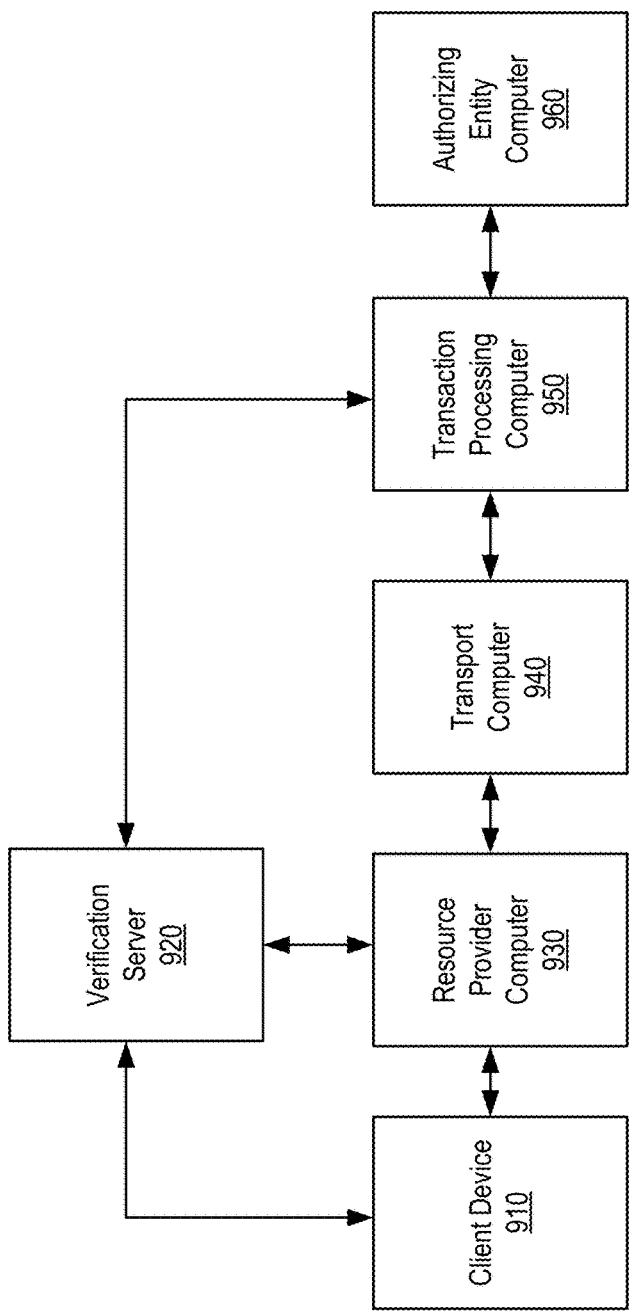
FIG. 9 shows a block diagram depicting a transaction processing system in which secure messaging with a key pair infrastructure may be used according to an embodiment of the present invention.

FIG. 9 shows a block diagram depicting a payment transaction processing system in which secure messaging with a key pair infrastructure may be used according to an embodiment of the present invention. FIG. 9 includes a client device 910, a verification server 920, a resource provider computer 930, a transport computer 940, a transaction processing computer 950, and an authorizing entity computer 960. Client device 910 may be implemented as client device 205 of FIG. 2, for example. Verification server 920 may be implemented as verification server 225 of FIG. 2, for example. Resource provider computer 930 may be implemented as access device 215 of FIG. 2, for example.

Client device 910 may be operated by a consumer who wishes to make a purchase at a resource provider associated with resource provider computer 930. However, the consumer may not want to share his PAN with resource provider computer 930 for security reasons. In another example, the resource provider may want to reduce its risk exposure and Payment Card Industry (PCI) Data Security Standard (DSS) responsibilities. Thus, resource provider computer 930 may want client device 910 to send the PAN instead to verification server 920. Verification server 920 may then replace the PAN with a token that can only be used by resource provider computer 930 for subsequent payment transactions.

While the connection between client device 910 and verification server 920 appears to be protected, there is no guarantee that the connection is end to end. For example, various middlemen may exist between client device 910 and verification server 920, such as corporate proxy servers, data loss prevention systems, compromised networks or hotspots, app accelerators, content delivery networks, load balancers, virus or malware scanners, and/or other security packet inspection applications. These middlemen may be targeted by malicious parties wishing to obtain PAN information exchanged between client device 910 and verification server 920.

Embodiments of the invention may be used to secure PANs transmitted over this connection. In response to an interaction with client device 910 (e.g., a checkout request on a website associated with resource provider computer 930), resource provider computer 930 may obtain a public key and key identifier from verification server 920. Resource provider computer 930 may push the public key and key identifier to client device 910, e.g., on a checkout form on the website. Client device 910 may use the public key to encrypt the PAN using a specialized application or built-in iOS/Android support for public key cryptography.

The encrypted PAN and the key identifier may be sent to verification server 920, where the PAN is decrypted and tokenized, as described further herein with respect to FIG. 8. The token is returned to resource provider computer 930 either directly or through client device 910. In some embodiments, verification server 920 uses the PAN to initiate processing of the transaction with the consumer through optional transport computer 940, transaction processing computer 950, and authorizing entity computer 960. In other embodiments, resource provider computer 930 uses the token to initiate processing of the transaction with the consumer (i.e., to generate an authorization request message that is passed through optional transport computer 940, transaction processing computer 950, and authorizing entity computer 960).

Figure 10:
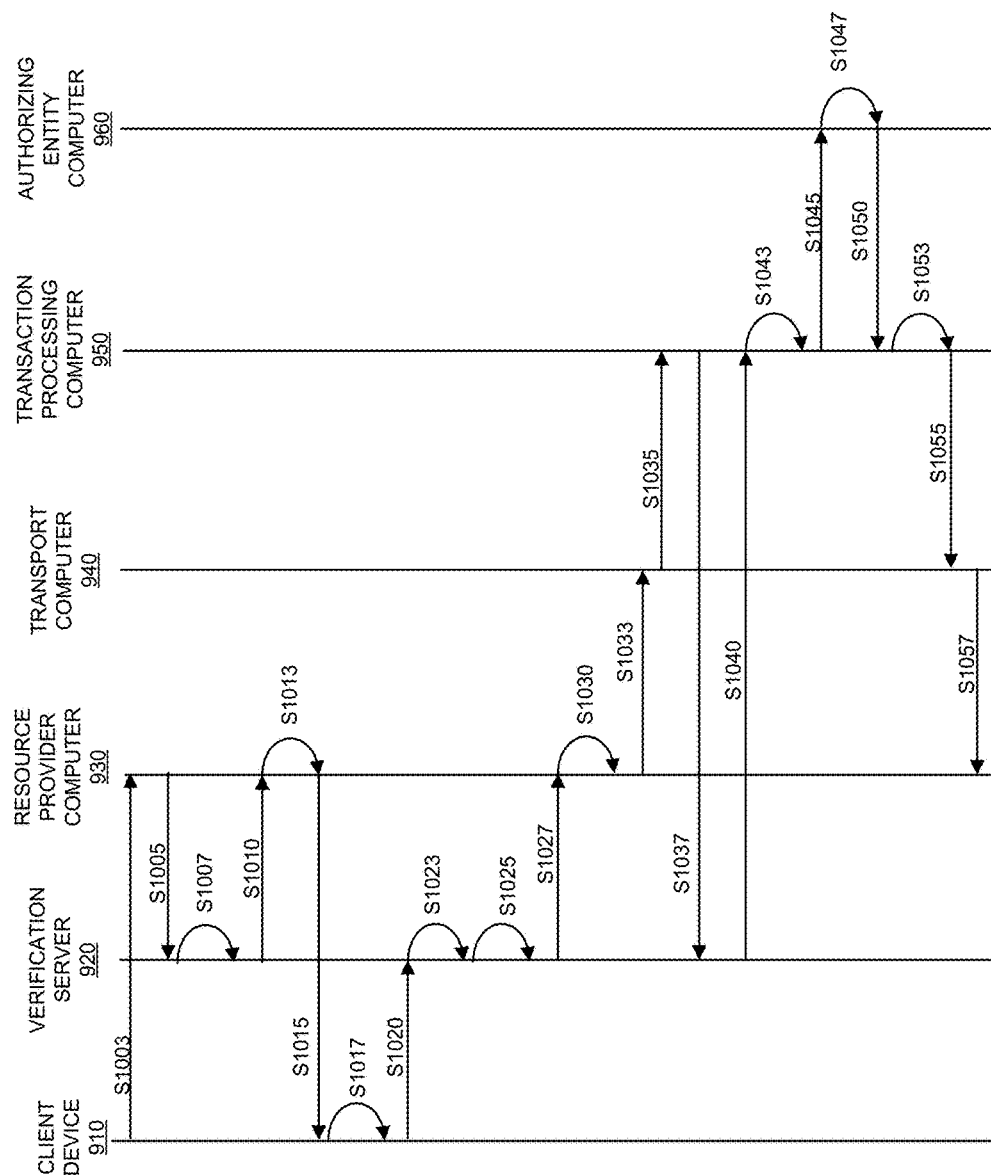
FIG. 10 shows a flow diagram depicting a method for secure messaging in a transaction processing system using a key pair infrastructure according to an embodiment of the invention.

FIG. 10 shows a flow diagram depicting a method for secure messaging in a transaction processing system using a key pair infrastructure according to an embodiment of the invention. At step S1003, client device 910 interacts with resource provider computer 930 to initiate a transaction. For example, client device 910 may shop on a website associated with resource provider computer 930, place items in the shopping cart, and request to check out. For the reasons discussed herein, resource provider computer 930 may not want direct access to sensitive information from client device 910, such as a PAN. Thus, at step S1005, resource provider computer 930 sends a request for a public key to verification server 920. The public key may be used by client device 910 to encrypt the PAN for secure communication.

At step S1007, verification server 920 generates the public key, a private key corresponding to the public key, and a key identifier associated with the private key. The public key and the private key may be limited-use keys, as described further herein. At step S1010, verification server 920 transmits the public key and the key identifier to resource provider computer 930. Verification server 920 may also transmit a signature with the public key that was generated with a shared secret previously established between verification server 920 and resource provider computer 930. Verification server 920 stores the private key and a copy of the key identifier in a database for later use.

At step S1013, resource provider computer 930 may optionally validate the signature using the shared secret to ensure that the public key has not been tampered with. Once the signature has been validated, resource provider computer 930 transmits the public key and the key identifier to client device 910 at step S1015.

At step S1017, client device 910 generates a message containing the PAN and encrypts the message using the public key. At step S1020, client device 910 sends the encrypted message and the key identifier to verification server 920. At step S1023, verification server 920 retrieves the private key associated with the key identifier and decrypts the encrypted message, restoring the original PAN.

At step S1025, verification server 920 generates a token corresponds to the PAN. In some embodiments, verification server 920 also generates a signature for the token using the private key. At step S1027, verification server 920 sends the token (and optionally the signature) to resource provider computer 930. In some embodiments, upon receipt, resource provider computer 930 verifies that the token has not been tampered with by validating the signature with the public key. The public/private key pair may then be invalidated as expired.

Processing of the transaction with the consumer may then be completed using the token. For example, at step S1030, resource provider computer 930 may generate an authorization request message for the transaction using the token. At step S1033, resource provider computer 930 may send the authorization request message including the token to transport computer 940. At step S1035, transport computer 940 may forward the authorization request message including the token to transaction processing computer 950.

At step S1037, transaction processing computer 950 determines that a token is being used instead of a PAN, determines the issuer of the token (i.e., verification server 920), and sends the token to verification server 920 for translation. At step S1040, verification server 920 determines the PAN corresponding to the token, and sends the PAN to transaction processing computer 950. At step S1043, transaction processing computer 950 replaces the token with the PAN in the authorization request message.

At step S1045, transaction processing computer 950 sends the updated authorization request message including the PAN to authorizing entity computer 960. At step S1047, authorizing entity computer 960 makes an authorization decision for the transaction (i.e., authorized or declined) based on any of a number of facts, such as, for example, available funds in the account, and generates an authorization response message. At step S1050, authorizing entity computer 960 sends the authorization response message including the PAN to transaction processing computer 950.

At step S1053, transaction processing computer 950 replaces the PAN in the authorization response message with the token. At step S1055, transaction processing computer 950 sends the updated authorization response message with the token to transport computer 940. At step S1057, transport computer 940 sends the updated authorization response message with the token to resource provider computer 930. Thus, resource provider computer 930 never has access to or comes in contact with the PAN. Resource provider computer 930 may then provide client device 910 with a receipt. Clearing and settlement may occur between transport computer 940 and authorizing entity computer 960 at a later time, such as at the end of the day.

Although shown and described in FIG. 10 as the resource provider computer 930 initiating transaction processing using the token, it is contemplated that other methods of initiating transaction processing may be used. For example, at step S1027, verification server 920 may provide resource provider computer 930 with the token only for recording purposes and to process future transactions with client device 910. However, processing of the current transaction with client device 910 may be initiated by verification server 920. For example, verification server 920 may generate an authorization request message for the transaction using transaction information provided by resource provider computer 930 as well as the PAN provided by client device 910. The transaction may then be processed as described above but with the PAN. The authorization response message with the PAN may be returned to verification server 920, who may replace the PAN with the token before returning the authorization response message to resource provider computer 930.

In addition, although shown and described with respect to an authorization flow in FIG. 10, it is contemplated that the messaging described herein may be used in other transaction processing contexts as well. For example, the resource provider computer 930 may use the messaging described herein to obtain and store a token representing a PAN for loyalty program purposes. Thus, authorization using the token is not required in some embodiments of the invention.

B. Additional Embodiments

Embodiments of the present invention may additionally or alternatively be used to encrypt any messages to any parties over a network. Some embodiments of the invention may be used to protect passwords, PINs, and/or codes, in addition to payment details. For example, a client device may desire access to a website hosted by an access device. However, the client device may not want to provide the password to the access device, as it may be highly sensitive (e.g., the same password used across multiple websites to access personal information, such as medical records, financial records, etc.). Thus, the client device may use embodiments of the invention to provide the encrypted password to a secure third party, who may verify the password and provide an indication to the access device that the client device should be allowed access to the website.

VI. EXAMPLE COMPUTER SYSTEMS

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art. For example, an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A verification server comprising:
   a processor; and
   a memory coupled to the processor, the memory storing instructions, which when executed by the processor, cause the verification server to perform operations including:
      receiving, over a first network, a request for a public key from an access device, wherein the access device sends the request in response to an interaction with a client device;
      generating the public key, a private key that corresponds to the public key, and a key identifier associated with the private key, wherein the public key and the private key are limited-use keys;
      transmitting the public key and the key identifier to the access device, wherein the access device transmits the public key and the key identifier to the client device;
      receiving, from the client device over a second network, a message and the key identifier from the client device, wherein the message is encrypted using the public key;
      retrieving the private key associated with the key identifier;
      decrypting the message using the private key;
      generating a signature of the public key using a shared secret, wherein the shared secret was previously shared between the verification server and the access device; and
      transmitting the signature of the public key to the access device with the public key and the key identifier, wherein the access device validates the signature of the public key using the shared secret, and wherein the access device transmits the public key and the key identifier to the client device after validation.

2. The verification server of claim 1, wherein the operations further include:
   generating a token in response to the message, wherein the token authorizes access to a resource; and
   transmitting the token to the access device.

3. The verification server of claim 2, wherein the token is transmitted to the access device via the client device.

4. The verification server of claim 1, wherein the operations further include:
   generating a token in response to the message, wherein the token authorizes access to a resource;
   generating a signature of the private key using the token and the private key; and
   transmitting the token and the signature of the private key to the access device, wherein the access device validates the signature of the private key using the public key and the token.

5. The verification server of claim 4, wherein the token and the signature of the private key are transmitted to the access device via the client device.

6. The verification server of claim 4, wherein the operations further include:
   expiring the private key after generating the signature of the private key.

7. The verification server of claim 1, wherein the private key associated with the key identifier is retrieved after determining that the key identifier has not expired.

8. The verification server of claim 1, wherein receiving the request for the public key occurs after generating the public key, the private key, and the key identifier.

9. The verification server of claim 1, wherein generating the public key, the private key, and the key identifier comprises generating a plurality of public keys including the public key, a plurality of private keys including the private key, and a plurality of key identifiers including the key identifier prior to receiving the request, and wherein after receiving the request, the operations further include:
   selecting the public key from the plurality of public keys, the private key from the plurality of private keys, and the key identifier from the plurality of key identifiers.

10. A method comprising:
   receiving, by a verification server over a first network, a request for a public key from an access device, wherein the access device sends the request in response to an interaction with a client device;
   generating, by the verification server, the public key, a private key that corresponds to the public key, and a key identifier associated with the private key, wherein the public key and the private key are limited-use keys;
   transmitting the public key and the key identifier to the access device, wherein the access device transmits the public key and the key identifier to the client device;
   receiving, by the verification server from the client device over a second network, a message and the key identifier from the client device, wherein the message is encrypted using the public key;
   retrieving the private key associated with the key identifier;
   decrypting the message using the private key;
   generating a signature of the public key using a shared secret, wherein the shared secret was previously shared between the verification server and the access device; and
   transmitting the signature of the public key to the access device with the public key and the key identifier, wherein the access device validates the signature of the public key using the shared secret, and wherein the access device transmits the public key and the key identifier to the client device after validation.

11. The method of claim 10, further comprising:
generating a token in response to the message, wherein the token authorizes access to a resource;
generating a signature of the private key using the token and the private key; and
transmitting the token and the signature of the private key to the access device, wherein the access device validates the signature of the private key using the public key and the token.

12. The method of claim 11, further comprising:
expiring the private key after generating the signature of the private key.

13. An access device comprising:
a processor; and
a memory coupled to the processor, the memory storing instructions, which when executed by the processor, cause the access device to perform operations including:
receiving a request to send a message from a client device;
in response to the request, requesting a public key from a verification server, wherein the verification server generates the public key, a private key that corresponds to the public key, and a key identifier associated with the private key, and wherein the public key and the private key are limited-use keys;
receiving the public key and the key identifier from the verification server;
transmitting the public key and the key identifier to the client device, wherein the client device encrypts the message using the public key and transmits the message and the key identifier to the verification server, and wherein the verification server retrieves the private key using the key identifier and decrypts the message using the private key, wherein the verification server generates a signature of the public key using the public key and a shared secret that was previously shared between the verification server and the access device, wherein the signature of the public key is received by the access device with the key identifier; and
validating the signature of the public key using the shared secret, wherein the public key and the key identifier are transmitted to the client device after validation.

14. The access device of claim 13, wherein after the verification server decrypts the message using the private key, the verification server generates a token corresponding to the message, wherein the token authorizes access to a resource, and wherein the operations further include:
receiving the token from the verification server.

15. The access device of claim 13, wherein after the verification server decrypts the message using the private key, the verification server generates a token corresponding to the message and generates a signature of the private key, wherein the token authorizes access to a resource, and wherein the operations further include:
receiving the token and the signature of the private key from the verification server; and
validating the signature of the private key using the public key.

16. The access device of claim 13, wherein the operations further include:
expiring the public key after the access device validates the signature of the public key using the shared secret.

17. The access device of claim 13, wherein before receiving the request to send the message, the operations further include:
sharing the shared secret with the verification server, wherein the verification server thereafter generates the signature of the public key using the public key and the shared secret;
receiving the signature of the public key with the public key and the key identifier;
validating the signature of the public key using the shared secret; and
transmitting the public key and the key identifier to the client device.

18. A method comprising performing, by an access device:
receiving a request to send a message from a client device;
in response to the request, requesting a public key from a verification server, wherein the verification server generates the public key, a private key that corresponds to the public key, and a key identifier associated with the private key, and wherein the public key and the private key are limited-use keys;
receiving the public key and the key identifier from the verification server;
transmitting the public key and the key identifier to the client device, wherein the client device encrypts the message using the public key and transmits the message and the key identifier to the verification server, and wherein the verification server retrieves the private key using the key identifier and decrypts the message using the private key, wherein the verification server generates a signature of the public key using the public key and a shared secret that was previously shared between the verification server and the access device, wherein the signature of the public key is received by the access device with the key identifier; and
validating the signature of the public key using the shared secret, wherein the public key and the key identifier are transmitted to the client device after validation.

19. The method of claim 18, wherein after the verification server decrypts the message using the private key, the verification server generates a token corresponding to the message, wherein the token authorizes access to a resource, the method further comprising:
receiving the token from the verification server.

20. The method of claim 18, wherein after the verification server decrypts the message using the private key, the verification server generates a token corresponding to the message and generates a signature of the private key, wherein the token authorizes access to a resource, the method further comprising:
receiving the token and the signature of the private key from the verification server; and
validating the signature of the private key using the public key.

21. The method of claim 18, further comprising:
expiring the public key after the access device validates the signature of the public key using the shared secret.

22. The method of claim 18, wherein before receiving the request to send the message, the method further comprising:
sharing the shared secret with the verification server, wherein the verification server thereafter generates the signature of the public key using the public key and the shared secret;
receiving the signature of the public key with the public key and the key identifier;

validating the signature of the public key using the shared secret; and transmitting the public key and the key identifier to the client device.

\* \* \* \* \*